Figure 1:
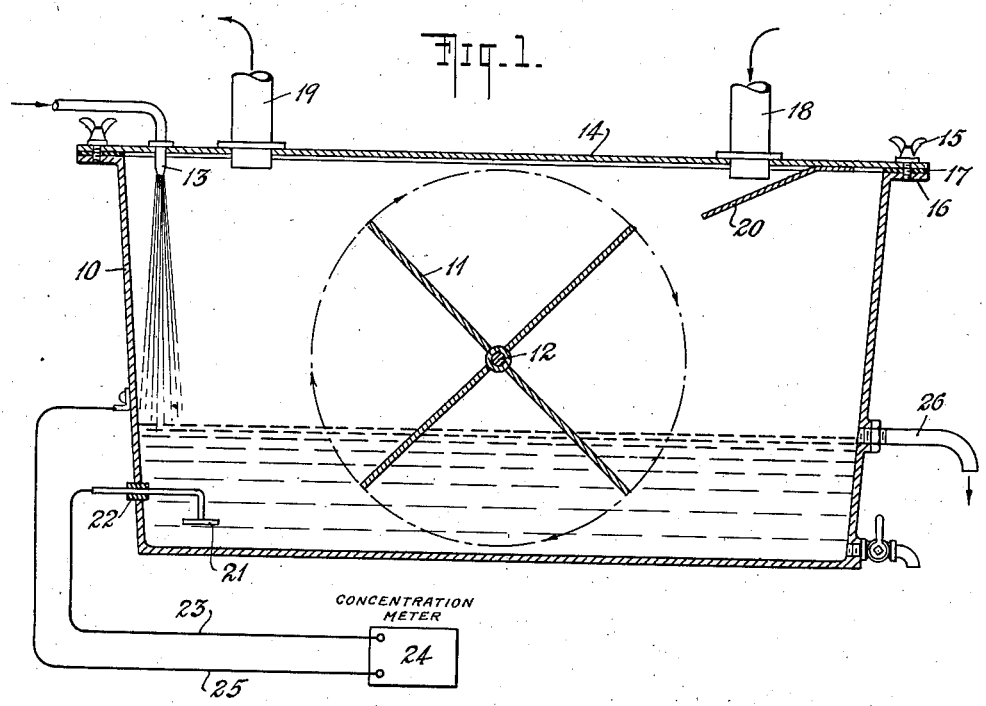

Feb. 18, 1941.　　　　　H. E. STUMP　　　　　2,231,965
METHOD OF CARBONATING LIME AND SEPARATING THE SAME FROM MAGNESIA
Filed June 22, 1937　　　2 Sheets-Sheet 1

INVENTOR
HORACE E. STUMP
BY
ATTORNEY

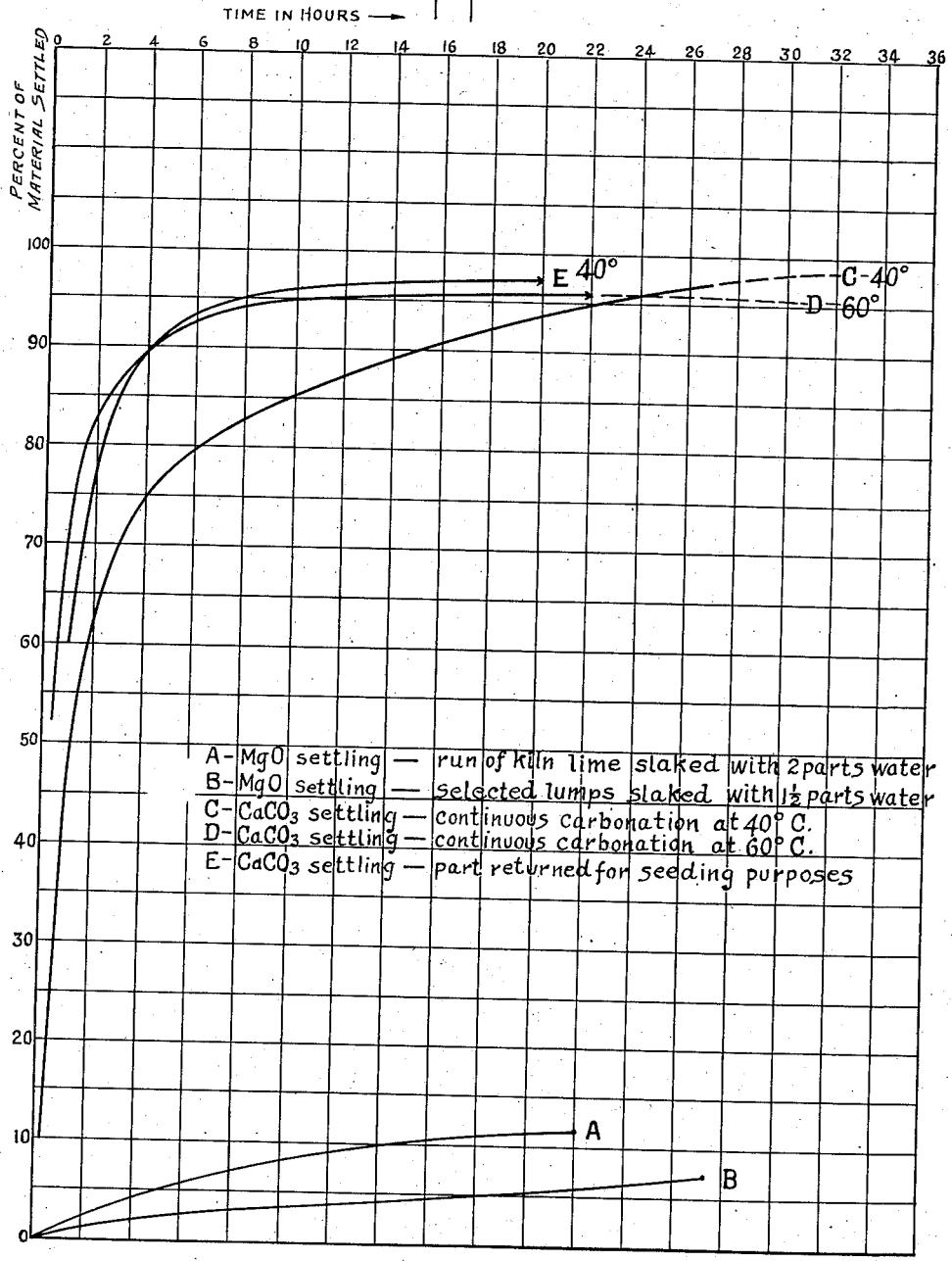

Patented Feb. 18, 1941

2,231,965

UNITED STATES PATENT OFFICE 2,231,965

METHOD OF CARBONATING LIME AND SEPARATING THE SAME FROM MAGNESIA

Horace E. Stump, Falls Village, Conn.; Bertha Baldwin Stump executrix of said Horace E. Stump, deceased Application June 22, 1937, Serial No. 149,557

14 Claims. (Cl. 23—201)

My invention relates to the separation of calcium from magnesium and more particularly to separation of lime from magnesia in mixed suspensions of these compounds with the aid of carbon dioxide.

The present application is a continuation in part of my pending application Ser. No. 112,882, filed Nov. 27, 1936.

It is an object of the present invention to provide an improved method of carbonating aqueous suspensions of calcium hydroxide and magnesium oxide and hydroxide whereby any one of a number of physically different kinds of chalk, each of more or less uniform character, may be precipitated at will and in such condition that it may be readily separated from the still suspended magnesium compound or compounds by settling, filtering, centrifuge or in any other suitable way.

It is also an object of the invention to provide a method of separating lime and magnesia whereby calcium and magnesium compounds are obtained having desirable physical characteristics, and in its at present preferred embodiment the invention contemplates the production of an unusually dense chalk which is suitable for use, for example, in connection with the manufacture of paint pigments and paper; while the magnesium is obtained in relatively pure condition at very low cost from naturally occurring mixtures with calcium, for example, minerals containing both calcium and magnesium and especially a slaked, burned dolomite. It is a further object of the invention to treat the magnesia suspension so separated in a manner which will facilitate its filtering or precipitation preparatory to its obtainment in the dried condition.

While the present invention is susceptible of working in such a manner that a relatively pure magnesium product is obtained, it is within the ambit of the invention to effect only a partial separation of the calcium from the magnesium so as to obtain a suspension having a higher proportion of magnesium than the starting material. A product of this kind is suitable for use in the manufacture of magnesia brick and for other industrial uses.

It is thus the general object of the invention to provide a method of treating aqueous suspensions of mixtures of calcium hydroxide and magnesium oxide (and generally also magnesium hydroxide) obtained, for example, by the slaking of limes produced by the burning of dolomite or other minerals containing calcium and magnesium carbonates, whereby a rapidly settling calcium carbonate and a slow settling magnesia milk are obtained, thus establishing the conditions favoring an efficient separation of the calcium from the magnesium in a simple and inexpensive manner, the calcium being precipitated in the form of dense particles of calcium carbonate and the magnesia remaining in a more or less colloidal form which can readily be separated from the precipitated chalk.

Briefly described, the present invention involves predetermining the character of the chalk precipitate by continuous carbonation of, for example, a slaked dolomitic lime milk at definitely maintained dissolved calcium hydroxide concentrations. I have found that the nature of the calcium carbonate precipitate, and especially its density and particle size, and hence the ease with which it can be separated gravimetrically from other suspended matter, is a function of the concentration of the calcium hydroxide at the moment of reaction with the carbon dioxide, and to a certain extent of other factors, such as temperature. In accordance with the invention, therefore, the character of the $CaCO_3$ precipitate is predetermined and controlled by maintaining the concentration of $Ca(OH)_2$ at a more or less fixed value during the precipitation of the $CaCO_3$, or within a limited range of values, by conducting the carbonation continuously and regulating the relative feeds of lime milk and carbon dioxide.

In the preferred manner of carrying out the invention, the calcium carbonate is continuously precipitated out of a solution of calcium hydroxide and magnesium oxide and hydroxide which is maintained continuously in a state of unsaturation with respect to the hydroxide. This may be accomplished by conducting a stream of lime milk, containing the excess $Ca(OH)_2$ in the form of fine particles, into a relatively large body of water having a low concentration (say, only 10–15% of saturation) of calcium hydroxide, whereupon the suspended, solid hydroxide immediately dissolves. The solution is reacted continuously with $CO_2$, which is fed at a rate equivalent to that of the hydroxide, the continuous precipitation of $CaCO_3$ leaving the solution permanently unsaturated with respect to the hydroxide. The carbonate remains in suspension and is preferably continuously withdrawn, the effluent suspension containing an amount of unreacted $Ca(OH)_2$ of the order of that in the unsaturated solution being carbonated. The particles or crystals of $CaCO_3$ obtained under the conditions stated are relatively dense and settle readily. The magnesia present in the treated lime milk remains in suspension, separation of the calcium from the magnesium being thus readily effected. Suitable methods for maintaining the desired concentration of Ca(OH)$_2$ will be described below.

It will be evident that by the continuous process just described, the particles of CaCO$_3$ remain suspended in a solution of Ca(OH)$_2$ whose concentration is substantially the same as that from which the particles were precipitated. These particles thus float about for a considerable period of time during which calcium carbonate of the same physical characteristics as themselves (because produced under the same conditions of calcium hydroxide concentration and temperature) is continuously precipitated. This period of time will, of course, depend upon the relative rate of feed of the milk of lime and the volume of liquid in the reaction vessel. Thus, if the latter is 15 times the volume of lime milk charged into the vessel per minute, then, since the outflow is the same as the inflow, the average length of time that a particle of CaCO$_3$ will remain in the vessel is 15 minutes. It is my belief that during this period the small particles of CaCO$_3$ act as nuclei upon which further quantities of CaCO$_3$ of the same physical nature deposit, thus producing relatively large and dense particles which separate more readily from the colloidal magnesia.

Investigations conducted by me on the character of the chalk precipitate obtained by batch carbonation of dolomitic lime milk as the concentration of calcium hydroxide progressively diminishes have shown that the product precipitated in the early stages of such batch carbonation, that is, from milk of lime having a large amount of suspended excess Ca(OH)$_2$, is of a relatively soft consistency and is difficult to handle, and for many purposes is undesirable in this condition. This product is even less desirable when it is sought to separate calcium from magnesium, for it does not settle quickly and carries down with it large proportions of magnesia, and so makes an efficient separation based on differences in density extremely difficult, if not impossible.

On the other hand, the continuance of the batch carbonation to the point where calcium bicarbonate is formed by reaction of excess CO$_2$ with CaCO$_3$, is objectionable because the solution must subsequently be heated to convert the bicarbonate to the normal carbonate. Where it is desired to separate calcium from magnesium, such overcarbonation is undesirable also for the reason that a part of the magnesium goes into solution, while the calcium bicarbonate that is formed tends to precipitate unconverted magnesia with it, so that efficient separation of the calcium from the magnesium by gravity or centrifuging is rendered practically impossible, since only the relatively small proportion of magnesia that has been converted to the soluble bicarbonate is separated from the mixture of precipitated calcium and magnesium. The invention accordingly contemplates carrying out the carbonation continuously under predetermined conditions of reduced calcium hydroxide concentration (the concentration being, however, greater than zero), such that the production of difficultly separable forms of precipitate is avoided. This I accomplish by maintaining the concentration of calcium hydroxide (dissolved and suspended, if undissolved hydroxide is present) continuously at a value greater than zero but lower than that corresponding to the mid-point of a batch carbonation (at which the hydroxide and carbonate are present in about equimolecular proportions) of a quantity of the same original suspension, but preferably, as already stated, the solution phase of the suspension is maintained more or less continuously unsaturated with respect to calcium hydroxide.

Various methods may be employed for maintaining the concentration of Ca(OH)$_2$ at the value required to produce the desired precipitate during the continuous carbonation of the lime solution. Thus the regulation of the relative feed of CO$_2$ and lime milk may be based on the results of the titration with acid of samples periodically taken from the effluent material, the amount of CO$_2$ liberated being a measure of the degree of carbonation and hence of the concentration of unreacted Ca(OH)$_2$.

A preferred method of controlling the carbonation treatment in the continuous process in accordance with the invention depends on the determination of the conductivity of the solution being carbonated. This mode of control is excellently suited for the regulation of an unsaturated solution and has the important advantage, that it can easily be made automatic, so as to cause the production of a substantially uniform precipitate, particularly when the temperature of carbonation is kept relatively constant. Suitable apparatus for maintaining the liquid being carbonated unsaturated with respect to Ca(OH)$_2$ will be described below.

Figure 2:
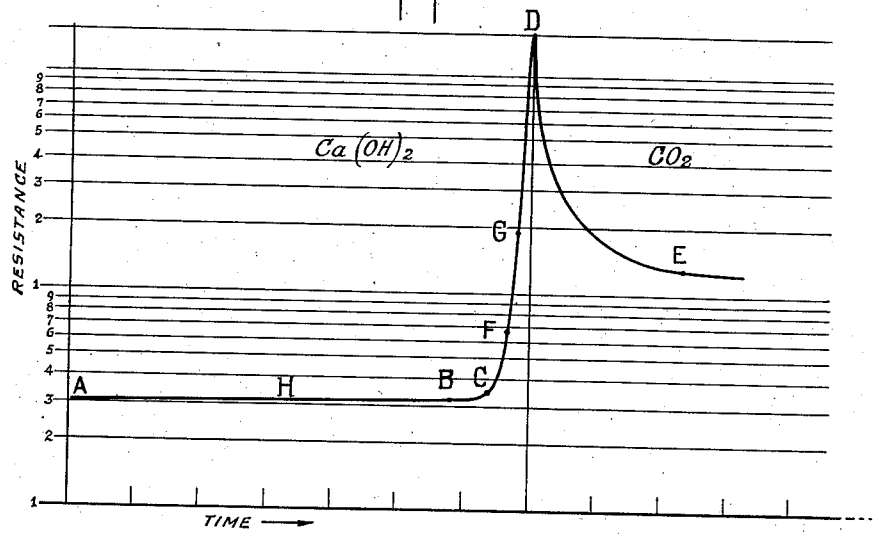

The invention will be further described by reference to the accompanying drawings wherein Fig. 1 illustrates diagrammatically a suitable apparatus for carrying out the invention;

Fig. 2 shows a time-resistance curve of the batch carbonation of a suspension of calcium hydroxide (milk of lime) at 40° C.; and Fig. 3 illustrates curves showing the effect of various conditions on the rapidity of separation by measurement of the percent of settled material.

The curve in Fig. 2 shows the change in the resistance of an aqueous suspension of calcium hydroxide containing floating solid particles, and originally saturated in the liquid phase, as the carbonation thereof proceeds by the batch method. The abscissae represent time, and also represent the total amount of Ca(OH)$_2$ (solid and liquid phases) in the suspension, the amount decreasing from the ordinate line (see point A) to the line passing through the point D (explained below) which represents a zero concentration of Ca(OH)$_2$. The curve is for a temperature of 40° C., this temperature being maintained constant by thermostatic control. As the carbonation proceeds, the resistance of the solution phase remains approximately constant from the point A to the point B. This is due to the fact that as dissolved Ca(OH)$_2$ continues to be precipitated in the form of the carbonate, it is continuously replaced by the solution of solid, suspended Ca(OH)$_2$. At the point B, the suspended solid Ca(OH)$_2$ is exhausted, and from then on the concentration of the liquid phase continuously falls and the resistance increases. As the carbonation proceeds with the accompanying fall of the concentration of electrolyte, the resistance begins to increase rapidly to the point C and from such point it rises still more rapidly until the point D is reached, which theoretically corresponds to a zero concentration of Ca(OH)$_2$ and to the solubility of CaCO$_3$ and of other substances present. This point D may be termed the isoelectric point. If the carbonation is continued, the resistance falls quite rapidly to approximately the point E from which point on it remains practically constant. The fall in resistance from D to E is probably due to the formation of calcium bicarbonate.

The interval from B to D represents the range of unsaturation of the calcium hydroxide solution. In accordance with the preferred mode of carrying out the invention, the carbonation of milk of lime is conducted continuously and the feed of the milk of lime and of the carbon dioxide is adjusted in such a manner that the concentration of the calcium hydroxide is maintained within the range of unsaturation B—D. To facilitate detection of a departure from the unsaturated range B—D either into the saturated range A—B or into the $CO_2$ (bicarbonate) range D—E, it is best to maintain the concentration within approximately the range F—G, corresponding to a concentration of approximately 10 to 15% of saturation, so that small changes in concentration will be readily ascertainable in view of the rapid rate of change of resistance with respect to change in concentration at such strengths. Somewhat lower concentrations than 10—15% may, however, be employed while yet realizing the advantages of my invention, and also higher concentrations, as explained hereinabove.

The presence of MgO and $Mg(OH)_2$, as in a dolomitic lime, does not materially change this curve because of the very low solubility of $Mg(OH)_2$.

It is important that the isoelectric point be not reached or passed and care should, therefore, be taken not to employ too large an excess of carbon dioxide or to continue the feed of carbon dioxide after the feed of the milk of lime has been interrupted. Passing of the isoelectric point produces a precipitate of less desirable qualities and in the case of the treatment of a mixture of calcium and magnesium hydroxides, the separation of the calcium from the magnesium is made very difficult. This is due to the fact that when the treatment is on the carbon dioxide side of the isoelectric point, the excess $CO_2$ converts the carbonate to the more soluble bicarbonate and the particles of calcium carbonate ultimately obtained from the latter are not as hard and as dense as the product obtained on the calcium hydroxide side; while in the treatment of dolomitic lime milk, the magnesia suspension tends to be carried down with the calcium carbonate, all of which is prejudicial to efficient separation. Another reason for avoiding passing the isoelectric point is that the magnesia is coagulated beyond such point and hence is carried down with the calcium carbonate, thereby reducing the magnesia recovery. A gravity separation, or a separation by centrifuge, of the precipitated chalk from the magnesia will under such circumstances not be as efficient as in the case of a mixture which has been maintained between the points F and G on the lime side.

The resistance curve shown in Fig. 2 applies, as already indicated, to batch carbonation at about 40° C. or higher. It does not, of course, represent the conditions existing in my improved process and is employed only to indicate the $Ca(OH)_2$ concentration for any found resistance. At lower temperatures, say 20° C., there appears clearly also a false or secondary isoelectric point at an earlier stage in a batch carbonation than the true isoelectric point. This secondary isoelectric point represents an intermediate high resistance condition in the solution when the latter should still contain a large quantity of $Ca(OH)_2$. Upon further carbonation, the resistance falls rapidly to approximately the original value, after which it again rises to the true isoelectric point after all of the calcium hydroxide has gone into solution and has been precipitated as carbonate. This secondary isoelectric point corresponds to the point H in Fig. 2 and is of different height (resistance) at different temperatures and at different rates of feed of $CO_2$. It does not, however, seem to occur at about 40° C. or higher.

The precipitate obtained by the carbonation (batch process) at this lower temperature (20° C.) of a commercial milk of lime up to approximately the secondary isoelectric point consists, in large part, if not entirely, of relatively light particles which do not settle readily, and in the case of the carbonation of a slaked dolomitic lime are difficult to separate from the magnesia suspension. This appears to be due to the presence of excess solid calcium hydroxide during the carbonation and it is my theory, although I do not wish to be understood as being committed thereto, that under these conditions, a basic carbonate, probably $Ca_2(OH)_2CO_3$, is first formed which is later broken up by additional carbon dioxide into calcium carbonate, this transition being responsible for the softness of the particles of the chalk. The product precipitated in advance of the secondary isoelectric point, and of the point H in Fig. 2, and in the region of such point, is generally of less desirable quality, at least when separation from magnesia is desired. This secondary isoelectric point, like the point H above described, corresponds in general to approximately the mid-point of the carbonation, that is, the condition of the carbonated batch in which the carbonate and hydroxide are present in about equimolecular proportions. Even when the batch carbonation graph for higher temperatures shows no clearly defined secondary isoelectric point, the precipitate varies in character just as if such secondary point existed, for the carbonate precipitated up to the point at which the hydroxide and carbonate are present in equimolecular proportions is of light, difficultly separable character, and particularly undesirable when it is sought to separate the calcium from the magnesium or, in general, to increase the relative MgO content of a calcium-magnesium lime.

I accordingly exclude from the scope of my claims the carbonation of a suspension which is continuously maintained at a $Ca(OH)_2$ concentration (solid and dissolved) ranging from that of the original suspension to that of the mid-point of the carbonation, the process according to the invention being conducted under such conditions that the concentration of total $Ca(OH)_2$ (that is, both dissolved and suspended hydroxide) is maintained approximately constant at a value greater than zero (the true isoelectric point) but smaller than that corresponding to the secondary isoelectric point or the equimolecular condition of $Ca(OH)_2$ solution above discussed.

The apparatus shown schematically in Fig. 1 comprises a tank 10 of stainless steel or any other suitable material which is provided with an agitator shown in the form of a paddle wheel 11 mounted upon a shaft 12 suitably journalled within the tank and rotating at a speed of about 400 r. p. m. The milky aqueous suspension of calcium hydroxide and magnesium oxide and hydroxide (slaked dolomitic lime), or other calcium hydroxide-containing-suspension, is introduced, preferably by means of one or more spray nozzles 13 which disperse the liquid into a large number of fine streams, into the carbon dioxide-laden atmosphere within the tank. The nozzles 13 pass through suitable openings in the cover plate 14 which is fastened in any suitable manner, as by threaded studs and nuts, shown at 15, to horizontal flanges 16 of the tank, a gasket 17 being interposed to insure gas tightness. The carbon dioxide inlet is shown at 18 and the gas outlet at 19. Any suitable trap (not shown) may be provided in the outlet to prevent escape of $CO_2$. A baffle plate 20 may be employed to direct the carbon dioxide upon the rotating paddle wheel.

The paddle wheel stirs the liquid into a violent froth, producing intimate contact between the solution and the gas over large areas. The gas may be that obtained by the burning of calcite or dolomite, flue gases or any other gas rich in carbon dioxide.

For maintaining the solution of calcium hydroxide at the selected degree of unsaturation, I provide an electrode 21 which passes through a suitably insulated stuffing box 22 and is connected by a conductor 23 with a mechanism for measuring concentration, as by way of conductivity, resistance, pH concentration, or in any other suitable manner. Where the tank is made of metal, it may form the other electrode and can be connected by a conductor 25 to the meter. If the tank is made of non-conducting material, two electrodes 21 will be employed and supported at a suitable distance from each other.

It will be understood that no particular size or arrangement of electrodes is necessary for the determination of the concentration. The electrodes may be of any suitable size and they may be spaced by any desired distance. Where the concentration is to be maintained by measurements of resistance or conductivity, the resistance or conductivity for a given arrangement of electrodes at the temperature of operation may be determined for different concentrations of calcium hydroxide and a curve plotted, so that the concentration of dissolved base can be easily read off for any found resistance. During the carbonation the resistance is maintained at the desired or "zero" value corresponding to the selected degree of unsaturation at which the liquid being treated is to be maintained. Variations from this "zero" value at either side, should be limited to such ranges that the solution neither reaches the isoelectric point or yet becomes so highly concentrated that the character of the chalk precipitate is substantially altered. The measuring instrument 24 may form part of or be connected to a control device, such as a damper or other valve, for regulating the feed of carbon dioxide and lime suspension relatively to each other in such a manner that the desired optimum concentration is maintained.

It will be understood that the apparatus hereinabove described is equally adapted for the carbonation of ordinary milk of lime suspension and of a suspension of slaked dolomitic lime, as described in my abovementioned copending application Ser. No. 112,882. The carbonation may continue indefinitely so long as the gas and lime milk are fed at such rates that the resistance or concentration of calcium hydroxide in solution is held at the proper point. I prefer to effect separation of the chalk from the suspended magnesia by gravity precipitation or by centrifuging.

To avoid local over-carbonation, resulting in local passing, even if only momentarily, of the isoelectric point D with resulting loss of magnesia to the calcium carbonate sludge, I prefer to "starve" the carbonator, that is, not to run it at its maximum carbonating capacity. Where kiln gas of 20 to 40% carbon dioxide content is employed, it is advisable to restrict the feed of gas so that the effluent gas contains 1% or less of carbon dioxide. The same result may be obtained by diluting the inlet gas with air, so that the mixture contains only 5–10% of carbon dioxide. In such event, a large excess of gas can be employed.

In an apparatus operated by me on a commercial scale, I have employed dolomitic milk of lime containing from 4% to 8% of solid bases in suspension. As the mixture was introduced into the tank, the paddle wheel 11 rotating, as aforesaid, at approximately 400 r. p. m., the suspended calcium hydroxide dissolved almost immediately, due to the margin of unsaturation of the relatively large body of liquid in the tank, and was immediately thrown out by practically instantaneous reaction between the dissolved calcium hydroxide and the carbon dioxide which kept the liquid phase unsaturated with respect to calcium hydroxide. The electrodes were of such size and so spaced that the resistance of the milk of lime solution (saturated) was 30 ohms. The feed of milk of lime and of carbon dioxide was so adjusted that during operation the resistance was between 100 and 200 ohms.

As it is desirable to avoid precipitation of calcium carbonate while the suspension contains an amount of $Ca(OH)_2$ corresponding approximately to the mid-point H of the carbonation, or even greater amounts, and as it is desirable also to avoid operating on the carbon dioxide side of the isoelectric point, the process may advantageously be begun by first introducing water into the apparatus while the gas is shut off. The dolomitic milk of lime in then fed into the carbonator, the resistance between the electrodes being carefully observed. As the concentration of calcium hydroxide solution increases, the resistance falls. When enough lime has been fed in to bring the resistance to about 150 ohms in the commercial apparatus just described (that is, within the range F—G, Fig. 1), the gas valve is opened and the carbonation begun. The feed of the reacting materials is so controlled that the resistance corresponding to the range F—G is continuously maintained. Obviously, automatic apparatus can be employed to open the gas valve as soon as the predetermined resistance is reached and the proper feed of lime milk and gas regulated automatically.

I may also start with the carbonator full of a previously made lot of calcium carbonate suspension which has not been brought past the isoelectric point and has a concentration of $Ca(OH)_2$ lying between the points H and D in Fig. 2, or preferably between F and G.

The outflowing suspension will, of course, contain approximately the same concentration of $Ca(OH)_2$ as that in the carbonator. This amounts to about 1% of total solids. For many uses, as for the manufacture of magnesia brick or lagging, this small amount of calcium hydroxide is unobjectionable. Where, however, a higher degree of purity is desired, as for pharmaceutical purposes, the suspension may be further carbonated, in a separate vessel, up to the isoelectric point to precipitate the calcium, care being taken not to pass such point. The magnesia suspension is then separated from the precipitate.

Particularly when the liquide phase of the suspension is maintained continuously in a state of unsaturation with respect to Ca(OH)₂ but on the calcium hydroxide side of the true isoelectric point, the chalk is precipitated in the form of dense, coarse particles which can easily be separated by gravity, while any magnesia that is present remains in suspension. I prefer to keep the concentration of the liquid phase quite low so as to insure against enrichment by the incoming material to the saturated solid calcium hydroxide containing condition, and especially the secondary isoelectric point or its equivalent, by a temporary fall in the relative rate of feed of CO₂. Thus, whereas the solubility of calcium hydroxide in water at room temperature is about 1.6 grams per liter, the preferred concentration in accordance with the invention, is maintained at approximately 0.15 grams per liter.

It should be noted that in my continuous process the calcium carbonate particles remain, on the average, for a considerable time in the reaction liquid under carbonate precipitating conditions which are the same as those under which the particles themselves were precipitated. This time period will be larger the greater the body of liquid in the carbonator in comparison with the volume of lime milk introduced per unit of time. It is my opinion that under these conditions the calcium carbonate particles grow to relatively large size and are of uniform character because of the uniform conditions of precipitation.

I have found that the rate of magnesia settling is a function of the dispersion of the lime milk which is to be carbonated. Thus with a lime milk prepared from dry hydrated lime, the process will ordinarily not operate satisfactorily because all dry hydrates are rather highly aggregated and the magnesia will settle about as rapidly as the resulting calcium carbonate. By slaking the dolomitic quick lime with two parts of water to one of lime and then thinning down the resulting putty, a milk is obtained which will give satisfactory results. Even better results can be obtained from a standpoint of the magnesia separation by careful burning (not overburning) of the lime and slaking it in 1½ parts of hot water to one of lime and vigorously stirring the mixture during the slaking and subsequent thinning operation.

Fig. 3 presents a number of curves showing the effect of various conditions on the speed of settling of the chalk and magnesia, the abscissae representing time in hours and the ordinates the percent of material precipitated referred to the total quantity of such material. Curves A and B show the speed of settling of a suspension of MgO prepared in different ways. The suspension to which curve A relates was slaked in two parts of water for each part of lime, the latter being run of the kiln lime. The material according to curve B was slaked in only 1½ parts of water for each part of lime, the latter being made up of selected lumps. It will be seen that the lime slaked originally with a smaller quantity of water and made up of selected lumps has a desirably lower speed of settling, which means a smaller detail of contaminations of precipitated chalk with magnesia.

Curve C, D and E show the rates of settling of the calcium carbonate, curve C representing the settling speed of a chalk prepared at 40° C., while curve D represents that of a chalk prepared at 60° C. The ideal settling curve for the calcium carbonate would, of course, be one approaching a right angle, the initial portion being substantially vertical, indicating rapid settling and meeting a substantially horizontal portion at approximately a right angle, substantially all of the calcium carbonate being precipitated at the abscissa corresponding to the position of the vertex of the right angle. It will be noted that curve D (60°) approaches this ideal curve much more closely than does curve C and for this reason I prefer to conduct the carbonation at about 60° C.

I have found that if a part of the effluent is run into the lime milk being fed into the carbonator, a more rapid settling of the carbonate is promoted. Thus curve E shows that with the aid of such partial return flow, the rate of settling of the chalk at 40° is improved to approximately that occurring with operation at 60° (the curve D). The returned effluent probably promotes the formation of larger and heavier particles by seeding.

My investigations have indicated that the factors effecting the settling of the magnesia seem not to affect the settling of the chalk, and on the other hand, the factors assisting in the rapid settling of the chalk do not appear to affect the rate of settling of the magnesia. The factors favoring the flattening of the curves A and B to approximately the horizontal condition (which is the ideal condition) can thus ordinarily be resorted to without fear of diminishing to any appreciable extent the rate of settling of the calcium carbonate and vice versa.

Experiments have shown that the chalk particle size can be controlled to some extent by regulation of the average carbonator time, and by the concentration of the lime milk fed to the carbonator. Thus by diluting the lime milk to about 1% Ca(OH)₂, a much smaller particle is obtained than when 7½ or 10% concentration is employed. If the rate of feed of carbon dioxide to the carbonator is kept constant, the average time of liquid in the carbonator will in the second case be 7½ to 10 times as long as in the first case, the increased time favoring the production of larger particles.

In certain cases it is desirable to keep the concentration of the Ca(OH)₂ at approximately the range B—C, as when a precipitate whose properties are characteristic of such range is desired, or when the feed of CO₂ is subject to such large fluctuations that there is danger that carbonation at the range F—G will be carried into the CO₂ range upon sudden increase in the rate of CO₂ feed. In such instances, the control instrument is set to increase slightly the rate of feed of the lime milk to bring the solution into the saturated range upon increase of the resistance to the value corresponding, for example, to the point C or thereabouts. The concentration of Ca(OH)₂ then lies in the range between saturation and the concentration corresponding to the resistance at C.

As can be seen from Fig. 2, the resistance is practically the same for concentrations from H to B, so that it would be difficult to maintain the concentration at a fixed value or limited range of values within such range H—B by measurement of the resistance. In such case, the proper concentration may be maintained by means of periodic titration, as suggested above, or in any other suitable manner.

The precipitated chalk produced in accordance with the invention is essentially crystalline and composed of discrete particles of unusual density and of an average size of about two microns. Chalk made in batch operations, on the other hand, even when the apparent particle size is about two microns, seems to consist of agglomerates of particles of sub-microscopic size. This latter type of precipitate is also produced when the carbonation is conducted continuously on the $CO_2$ side of the isoelectric point.

While the temperature at which batch carbonation takes place is very important, as it determines the character of the precipitated chalk, the specific temperature of carbonation is of relatively minor importance in my continuous process. In the carbonation of a dolomitic lime suspension, the temperature of carbonation has, however, an effect upon the character of the supernatant magnesia suspension, continuous carbonation at 40° C. or above, generally giving a more hydrous $Mg(OH)_2$ than material made at 20° C.

When the material to be carbonated is a suspension of calcium hydroxide and magnesia, there is obtained a surprisingly stable colloidal suspension of magnesia carrying dense particles of precipitated chalk, the suspension flowing off continuously through the overflow 26. The chalk can be separated from the magnesia suspension by gravity or by centrifuge and even by filtering, as the colloidal solution readily passes through a filter. After the carbonation has continued for some time, the effluent suspension of calcium carbonate will be of the same calcium concentration (i. e. the metal ion) as the incoming lime milk and will contain a quantity of $Ca(OH)_2$ in solution approximately equal to that at which the carbonate was precipitated.

To obtain the magnesia in usable form, the colloidal suspension is passed rapidly through a further carbonator wherein the carbonation is continued until the resistance of the suspension is raised nearly to or slightly beyond the isoelectric point. This subsequent treatment with carbon dioxide clumps or coagulates the colloid and renders it susceptible to filtration or to concentration in a second centrifuge.

Other reagents may be used to break up the colloidal suspension, such as aluminum sulfate, sodium carbonate, caustic soda and other electrolytes, but in their use introduce an impurity, and I accordingly prefer the use of carbon dioxide, the resistance of the suspension being held preferably beyond but near to the isoelectric point to avoid loss of magnesium by solution as the bicarbonate.

In practice I find it desirable to slake the dolomite lime to a lime milk containing about 7% of calcium and magnesium oxides, the suspension being screened to remove coarse particles of unburned stone, silicious matter and the like. The particles of calcium hydroxide should be of such small size that they dissolve rapidly in the body of liquid in the carbonator.

The carbonation of dolomite milk in the manner above described yields a calcium carbonate which settles out rapidly and separation may be readily accomplished by sedimentation over 8 hours' time, at the end of which the supernatant colloidal suspension of magnesium oxide and hydroxide will analyze 80 to 90% MgO, the remainder being calcium carbonate and hydroxide, while the heavy settling mud will comprise 90 to 95% of calcium carbonate, the remainder being magnesium oxide. The separation may be accomplished more rapidly by passing the suspension through a centrifugal machine, the effluent liquid carrying off the magnesium, while a heavy calcium carbonate sludge remains behind. Depending upon the speed of the centrifuge and the time in the basket, the effluent, extremely stable colloidal suspension of magnesia may vary from 80 to 99% MgO.

The product is a magnesium oxide-hydroxide which will calcine to the oxide at a low temperature, in contrast to the products obtained by known processes, such as the Patterson process, which are basic magnesium carbonates and require a higher calcination temperature and yield a fluffier and lighter product.

The magnesia obtained as above described and having an MgO content of 85% or higher is well suited for the manufacture of refractory material. Upon further purification, a material suitable for pharmaceutical use may be obtained. It will be obvious that my process may be employed to enrich a dolomitic lime in MgO by partial precipitation of the calcium.

I claim:

1. The method of separating calcium from magnesium in an aqueous suspension of calcium hydroxide and magnesia, which comprises feeding such suspension continuously into a reaction vessel, treating the suspension with carbon dioxide while substantially continuously maintaining the concentration of the calcium hydroxide solution at a value between that corresponding to equimolar concentrations of calcium hydroxide (dissolved and undissolved) and calcium carbonate and that corresponding to the isoelectric point of the liquid phase of the suspension but in advance of the isoelectric point, whereby the major proportion of lime becomes carbonated while substantially all of the magnesia remains as such in relatively stable suspension, continuously withdrawing the suspension of calcium carbonate and magnesia from said vessel, and separating the suspended calcium carbonate from the magnesia.

2. The method of separating calcium from magnesium in an aqueous suspension of calcium hydroxide and magnesia containing undissolved calcium hydroxide, which comprises feeding such suspension continuously into a reaction vessel, treating the suspension with carbon dioxide while maintaining the concentration of the calcium hydroxide solution substantially continuously at a value between that corresponding to equimolar concentrations of calcium hydroxide (dissolved and undissolved) and calcium carbonate and that corresponding to the isoelectric point of the liquid phase of the suspension, but in advance of the isoelectric point, whereby the major proportion of lime becomes carbonated while substantially all of the magnesia remains as such in relatively stable suspension, continuously drawing off the resulting suspension of magnesia and precipitated chalk, and separating the chalk from the suspension by gravity.

3. The method of separating calcium from magnesium in an aqueous suspension of calcium hydroxide and magnesia containing undissolved calcium hydroxide, which comprises feeding such suspension continuously into a reaction vessel, treating the suspension with carbon dioxide while maintaining the concentration of the calcium hydroxide solution at a value between that corresponding to equimolar concentrations of calcium hydroxide (dissolved and undissolved) and calcium carbonate and that corresponding to the isoelectric point of the liquid phase of the suspension, but in advance of the isoelectric point, whereby the major proportion of lime becomes carbonated while substantially all of the magnesia remains as such in relatively stable suspension, continuously drawing off the resulting mixture of magnesia and precipitated chalk, separating the chalk from the magnesia suspension, and then precipitating the magnesia from the latter suspension.

4. The method according to claim 1 wherein the carbonation takes place at a temperature of about 60° C.

5. The method according to claim 1 wherein part of the withdrawn suspension of calcium carbonate and magnesia is mixed with the suspension of calcium hydroxide and magnesia and thus returned to the carbonator.

6. The method of separating calcium from magnesium in an aqueous suspension of calcium hydroxide and magnesia which comprises slaking a dolomitic quick lime with from 1½ to 2 parts of water to each part of lime, thinning down the resulting putty, and treating the suspension with carbon dioxide while substantially continuously maintaining the concentration of the calcium hydroxide solution at a value greater than that corresponding to the isoelectric point of the liquid phase of the suspension but less than that corresponding to the equimolecular condition of calcium hydroxide (dissolved and undissolved) and calcium carbonate, withdrawing the suspension of calcium carbonate and magnesia and separating the carbonate from the suspension.

7. The method according to claim 6 wherein the dolomitic quick lime is substantially free from overburned parts and is slaked in 1½ parts of hot water, the mixture being stirred during the slaking and the subsequent thinning operation.

8. In a method of separating calcium from magnesium in an aqueous suspension of calcium hydroxide and magnesia, the steps which comprise feeding such suspension continuously into a reaction vessel, treating the suspension with carbon dioxide while maintaining the concentration of calcium hydroxide in the liquid phase at a value substantially continuously of the order of about 10-15% of saturation, continuously withdrawing the carbonated suspension, allowing the calcium carbonate to precipitate out of the magnesia suspension, and separating the precipitate from the magnesia suspension.

9. The method of separating calcium from magnesium in an aqueous suspension of calcium hydroxide and magnesia containing undissolved calcium hydroxide, which comprises feeding such suspension continuously into a reaction vessel, treating the suspension with carbon dioxide while maintaining the calcium hydroxide solution in a state of unsaturation, but in advance of the isoelectric point of the liquid phase of the suspension, continuously drawing off the resulting mixture of magnesia and precipitated chalk, separating the chalk from the magnesia suspension, and subsequently treating the magnesia suspension with an electrolyte to effect precipitation of the magnesia.

10. The method of separating calcium from magnesium in an aqueous suspension of calcium hydroxide and magnesia containing undissolved calcium hydroxide, which comprises feeding such suspension continuously into a reaction vessel, treating the suspension with carbon dioxide while maintaining the concentration of the calcium hydroxide solution at a value between that corresponding to equimolar concentrations of calcium hydroxide (dissolved and undissolved) and calcium carbonate and that corresponding to the isoelectric point of the liquid phase of the suspension, but above zero, whereby the major proportion of lime becomes carbonated while substantially all of the magnesia remains as such in relatively stable suspension, continuously drawing off the resulting mixture of magnesia and precipitated chalk, separating the chalk from the magnesia suspension, subsequently treating the magnesia suspension with a limited amount of carbon dioxide until the colloidal nature of the suspension is destroyed, and then separating the precipitated magnesia.

11. In a method of separating calcium from magnesium in an aqueous suspension of calcium hydroxide and magnesia, the steps which comprise feeding such suspension substantially continuously into a reaction vessel, treating the suspension with carbon dioxide at such a rate relative to the rate of introduction of the suspension that the concentration of calcium hydroxide in the liquid phase is maintained substantially continuously in the unsaturated range but greater than zero, substantially continuously withdrawing the carbonated suspension, and separating the calcium carbonate from the magnesia suspension.

12. A method according to claim 11 in which the withdrawn carbonated suspension is allowed to rest in a settling tank to effect precipitation of the calcium carbonate, and thereafter withdrawing the magnesia suspension.

13. A method according to claim 11, wherein the withdrawn, carbonated suspension is treated with a limited amount of carbon dioxide to precipitate the dissolved calcium hydroxide as carbonate.

14. A method according to claim 11 in which, following the separation of the precipitated calcium carbonate from the magnesia suspension in the withdrawn carbonated suspension, the magnesia suspension is treated with a limited amount of carbon dioxide to promote precipitation of the magnesia.

HORACE E. STUMP.